US012580504B2

(12) United States Patent
Nigam et al.

(10) Patent No.: US 12,580,504 B2
(45) Date of Patent: Mar. 17, 2026

(54) CURRENT BASED RESONANT FREQUENCY TRACKING SYSTEM

(71) Applicant: Maxim Integrated Products, Inc., San Jose, CA (US)

(72) Inventors: Vivek Prakash Nigam, Dublin, CA (US); Sangwon Lee, Pleasanton, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 469 days.

(21) Appl. No.: 18/209,289

(22) Filed: Jun. 13, 2023

(65) Prior Publication Data

US 2024/0030843 A1    Jan. 25, 2024

Related U.S. Application Data

(60) Provisional application No. 63/369,172, filed on Jul. 22, 2022.

(51) Int. Cl.
| | |
|---|---|
| *H02P 1/00* | (2006.01) |
| *H02P 3/00* | (2006.01) |
| *H02P 5/00* | (2016.01) |
| *H02P 6/00* | (2016.01) |
| *H02P 6/182* | (2016.01) |
| *G06F 3/01* | (2006.01) |

(52) U.S. Cl.
CPC .............. *H02P 6/182* (2013.01); *H02P 6/006* (2013.01); *G06F 3/016* (2013.01)

(58) Field of Classification Search
CPC ................................. H02P 6/182; H02P 6/006
USPC ......................................................... 318/114
See application file for complete search history.

(56) References Cited

U.S. PATENT DOCUMENTS

| | | | |
|---|---|---|---|
| 2019/0384400 A1* | 12/2019 | Cruz-Hernandez ..... | G06F 3/016 |
| 2019/0385421 A1* | 12/2019 | Shah ........................ | G08B 6/00 |
| 2023/0237886 A1* | 7/2023 | Janko ...................... | B06B 1/045 |
| | | | 340/407.1 |

* cited by examiner

*Primary Examiner* — Erick D Glass
(74) *Attorney, Agent, or Firm* — DLA Piper LLP (US)

(57) ABSTRACT

A current based resonant frequency tracking system and methods can include: providing a haptic pattern with a processor, the haptic pattern including both a haptic pattern start time and a haptic pattern stop time; driving a linear resonant actuator according to the haptic pattern with an amplifier coupled to the processor, and the amplifier having an output coupled to the linear resonant actuator; detecting a current sense signal having a back electromotive force current after the haptic pattern stop time with a current frequency tracker coupled to the output of the amplifier; measuring a frequency of the back electromotive force current as a resonant frequency of the linear resonant actuator; and detecting cycles in the back electromotive force current after the haptic pattern stop time.

20 Claims, 4 Drawing Sheets

100

700

CURRENT BASED RESONANT FREQUENCY TRACKING SYSTEM

CROSS-REFERENCE TO RELATED APPLICATION(S)

This claims priority benefit to all common subject matter of U.S. Provisional Patent Application 63/369,172 filed Jul. 22, 2022. The content of this application is incorporated herein by reference.

TECHNICAL FIELD

This disclosure relates to linear resonant amplifiers (LRAs), more particularly to tracking LRA resonant frequency with current.

BACKGROUND

The rapidly growing market for portable electronic devices including cellular phones, laptop computers, and wearables, is an integral facet of modern life. These devices have unique attributes that have significant impacts on manufacturing and design in that they must be generally small, lightweight, and efficient and they must be produced in high volumes at relatively low cost.

The consumer electronics industry has witnessed ever-increasing commercial competitive pressures, along with growing consumer expectations and the diminishing opportunities for meaningful product differentiation in the marketplace. The advancement towards miniaturization and greater functionality has imposed constraints to the design of consumer electronics, which importantly include efficient use of battery power at low cost and complexity.

Consumer electronic devices commonly rely on linear resonant actuators (LRAs) to provide haptic feedback in the form of vibrations to a user. LRAs need to be driven by patterns that are tuned to the real inherent resonant frequency of the LRA for a strong tactile experience at low power consumption.

Due to manufacturing tolerances, physical conditions, and wear and tear each LRA unit exhibits a unique resonant frequency. LRAs not driven at their resonant frequency results in under-powered vibration and larger power usage, both of which are undesirable and disadvantageous in consumer electronics.

Providing a powerful and efficient vibration for LRA's at a low cost and complexity represents a technical challenge that has been long felt within the consumer electronics industry and this technical challenge requires an accurate determination of the resonant frequency of an LRA. Previous developments have attempted to solve this problem in many ways but none of the previous developments have provided a complete solution.

One such prior development is to provide a "High-Z" measurement at the output of the LRA after the LRA is excited to a vibration. A High-Z measurement requires the driving signal to be shut off temporary while the LRA's output is floated, with respect to ground, and voltage measurements of the LRA's back-EMF are taken.

The High-Z measurement provides only a partial solution in that the resonant frequency can be measured but it comes at the expense of interrupting the driving signal to float the LRA output, which causes unpleasant artifacts and distortions for a user. These artifacts and distortions are especially problematic with the use of dual mode LRAs producing sound as the interruptions are even more detectable by users.

The High-Z measurement also requires additional components since a switch and additional circuitry are required to create the High-Z output of the LRA. Additional components increase unit and material costs while also increasing costs of greater complexity in design and manufacturing.

Another previous development is to measure the resonant frequency at the factory during production. While this does result in a useable resonant frequency for an LRA, the resonant frequency of the LRA will drift over time as a result of heat, humidity, and wear and tear. As the LRA drifts from the resonant frequency measured by the factory, the factory measurement becomes inaccurate and its use to drive an LRA will produce inefficient and weak vibration.

In view of the ever-increasing commercial competitive pressures, along with growing consumer expectations and the diminishing opportunities for meaningful product differentiation in the marketplace, it is critical that answers be found for these problems. Thus, a need remains for accurate and up-to-date determinations of an LRA's resonant frequency providing powerful and efficient vibration at low cost, low complexity, and without requiring a High-Z output. Solutions have been long sought but prior developments have not taught or suggested any solutions and, thus, solutions to these problems have long eluded those skilled in the art.

BRIEF DESCRIPTION OF THE DRAWINGS

The current based resonant frequency tracking system is illustrated in the figures of the accompanying drawings which are meant to be exemplary and not limiting, in which like reference numerals are intended to refer to like components, and in which.

DETAILED DESCRIPTION

Figure 1:
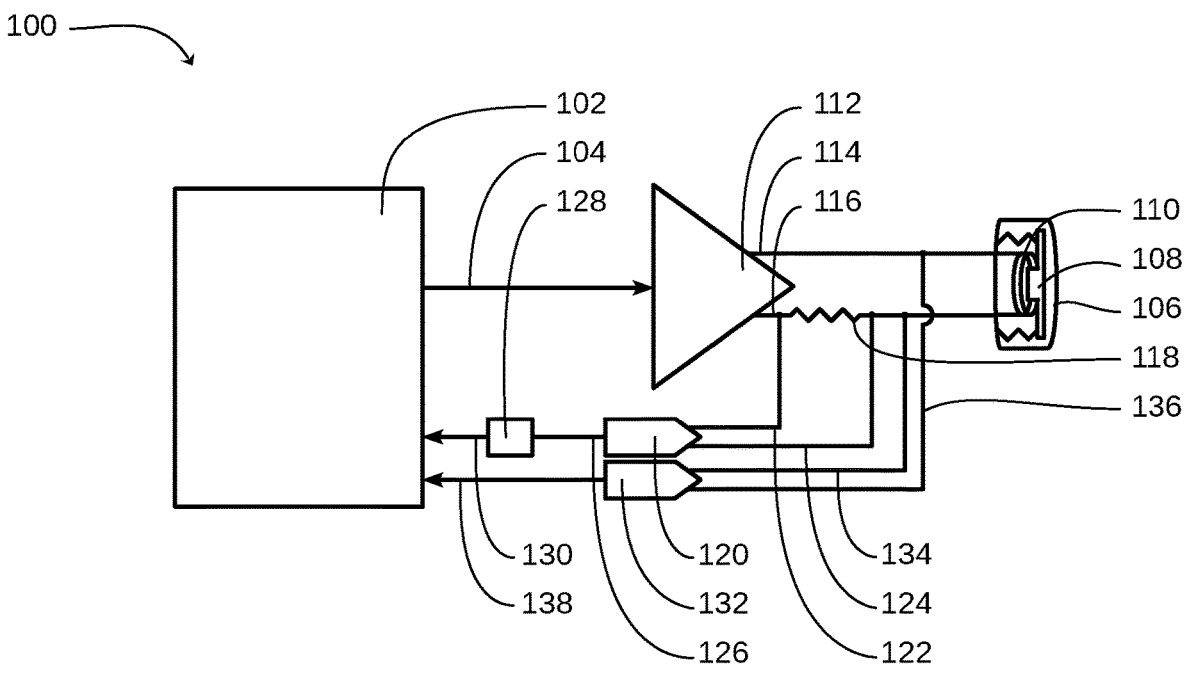
FIG. 1 is a schematic view of the current based resonant frequency tracking system.

In the following description, reference is made to the accompanying drawings that form a part hereof, and in which are shown by way of illustration, embodiments in which the current based resonant frequency tracking system may be practiced. It is to be understood that other embodiments of the resonant frequency tracking system may be utilized, and structural changes may be made without departing from the scope of the resonant frequency tracking system.

When features, aspects, or embodiments of the resonant frequency tracking system are described in terms of steps of a process, an operation, a control flow, or a flow chart, it is to be understood that the steps can be combined, performed in a different order, deleted, or include additional steps without departing from the resonant frequency tracking system as described herein.

The current based resonant frequency tracking system is described in sufficient detail to enable those skilled in the art to make and use the resonant frequency tracking system and provide numerous specific details to give a thorough understanding of the resonant frequency tracking system; however, it will be apparent that the resonant frequency tracking system may be practiced without these specific details.

In order to avoid obscuring the resonant frequency tracking system, some well-known system configurations and descriptions are not disclosed in detail. Illustratively, analog-to-digital converter circuitry, digital signal processing techniques, and similar technologies in common use with modern dual mode LRAs, are not described in detail and should be understood as within the skill of those having ordinary skill in the dual mode linear resonant actuator arts.

Likewise, the drawings showing embodiments of the system are semi-diagrammatic and not to scale and, particularly, some of the dimensions are for the clarity of presentation and are shown greatly exaggerated in the drawing FIGs. As used herein, the term "couple" as in "coupling" or "coupled" means a direct or indirect physical connection between elements.

Referring now to FIG. 1, therein is shown a schematic view of a resonant frequency tracking system 100. The resonant frequency tracking system 100 can include a processor 102.

The processor 102 can be an audio digital signal processor or a host processor running a resonant frequency tracking algorithm. The processor 102 can output a haptic pattern 104, which is the vibrational pattern stimulus resulting in vibration from a linear resonant actuator (LRA 106) coupled indirectly thereto.

The LRA 106, can take many configurations but common to most is a vibrating mass 108 and a motion inducer 110. The vibrating mass naturally vibrates with a unique resonant frequency and is driven by the motion inducer 110. It is contemplated that the LRA 106 could be a dual mode LRA capable of producing audible tones in addition to a haptic vibration.

Illustratively, for example, the vibrating mass 108 can be a mass coupled to a spring, a springy extended rod, a mass coupled to compliant or deformable components, or a combination thereof. The motion inducer 110 could be an inductive coil, a piezo electric actuator, or a combination thereof.

The haptic pattern 104 can be input into an amplifier 112. The amplifier 112 can increase both voltage and current of the haptic pattern 104 to drive the LRA 106 and produce vibrations and audible tones.

The amplifier 112 can be communicatively coupled to the LRA 106 with an output N line 114 and an output P line 116. The output P line 116 can further include a current resistor 118 connected along and in line with the output P line 116 between the amplifier 112 and the LRA 106.

The resonant frequency tracking system 100 can track and measure the drive current and the drive voltage from the amplifier 112 to the LRA 106 with a current frequency tracker. The current frequency tracker can be an analog-to-digital converter (current ADC 120) measuring a voltage drop across the current resistor 118.

The voltage drop across the current resistor 118 can be divided by the value of the current resistor 118 to compute and determine the current through the output P line 116 and across the current resistor 118. This current measurement can be taken continually during operation of the LRA 106 and does not require the LRA 106 to be placed in a High-Z measurement state and does not therefore produce undesirable distortions and interruptions in the output of the LRA 106, as other methods are known to do.

An unexpected benefit of measuring current with the current resistor 118, in line on the output P line 116 between the amplifier 112 and the LRA 106, is that the current ADC 120 can measure not only the drive current to the LRA 106 but also current created by back electromotive force (back EMF) of the LRA 106 when the LRA 106 is not being driven by the haptic pattern 104. This back EMF current measurement of the LRA 106 provides many benefits from being continually monitored in line to being representative of the resonant frequency of the LRA 106, as is discussed below with regard to FIGS. 3-5.

It has been further and unexpectedly discovered that measuring current created by the back EMF of the LRA 106 allows a standard audio amplifier to be used and since the current is measured internally, no external connections are required. Lower costs can thereby be realized since specialized LRA amplifiers are not required, nor are the additional components used to High-Z the output of the LRA 106 required.

It is to be understood that the current resistor 118 does not measure voltage across the LRA 106 but only measures current on the output P line 116 and across the current resistor 118. Voltage measurements across the LRA 106 do not provide the back EMF reading without being in a High-Z state.

The current frequency tracker is depicted as the current ADC 120 measuring the voltage drop across the current resistor 118; however, other current frequency trackers are contemplated including cored current sensors, and core-less current sensors. The cored current sensors can be open loop, closed loop, or fluxgate.

The current ADC 120 can be communicatively coupled to the output P line 116 on either side of the current resistor 118. That is, the current ADC 120 can have a first current detection line 122 coupled between the amplifier 112 and the current resistor 118. The current ADC 120 can further have a second current detection line 124 coupled to the output P line 116 between the current resistor 118 and the LRA 106.

The current ADC 120 can output a current sense signal 126 that can be filtered with a low pass filter 128 to provide a filtered current sense signal 130. It is contemplated that the current sense signal 126 could be filtered within the processor 102 using digital filtering through digital signal processing or could be filtered with a filter constructed of discrete components such as resistors and capacitors, as shown.

Tracking the drive voltage can be accomplished by way of a voltage ADC 132 measuring a voltage drop across the output N line 114 and the output P line 116. The voltage ADC 132 can have a first voltage detection line 134 coupled to the output P line 116 between the current resistor 118 and the LRA 106.

The voltage ADC 132 can have a second voltage detection line 136 coupled to the output N line 114 between the amplifier 112 and the LRA 106. The voltage ADC 132 can output a voltage sense signal 138, which can be input into the processor 102.

Figure 2:
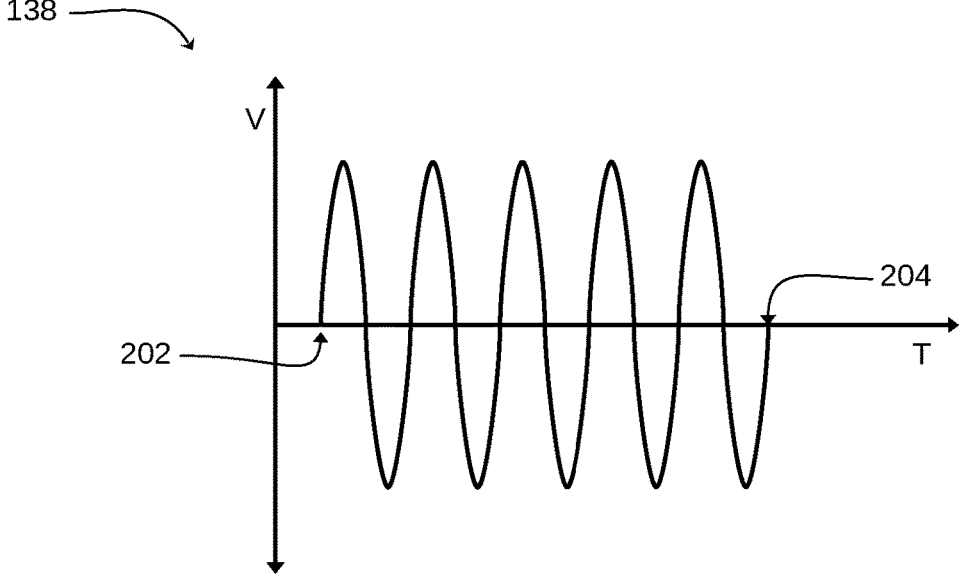
FIG. 2 is the voltage sense signal of FIG. 1.

Referring now to FIG. 2, therein is shown the voltage sense signal 138 of FIG. 1. The voltage sense signal 138 can be a digital representative, produced by the voltage ADC 132 of FIG. 1.

The voltage sense signal 138 can be the voltage across the output N line 114 and the output P line 116 between the amplifier 112 and the LRA 106 and output by the voltage ADC 132, all of FIG. 1. The voltage sense signal 138 can be proportional to the haptic pattern 104 of FIG. 1.

The voltage sense signal 138 is depicted with the graph having voltage indicated by the vertical axis and time indicated by the horizontal axis. The voltage sense signal 138 is shown having a haptic pattern start time 202 and a haptic pattern stop time 204, which are the beginning and end, respectively, of the haptic pattern 104 transmission to the LRA 106. The voltage detected by the voltage ADC 132 prior to the haptic pattern start time 202 and after the haptic pattern stop time 204 is zero.

Figure 3:
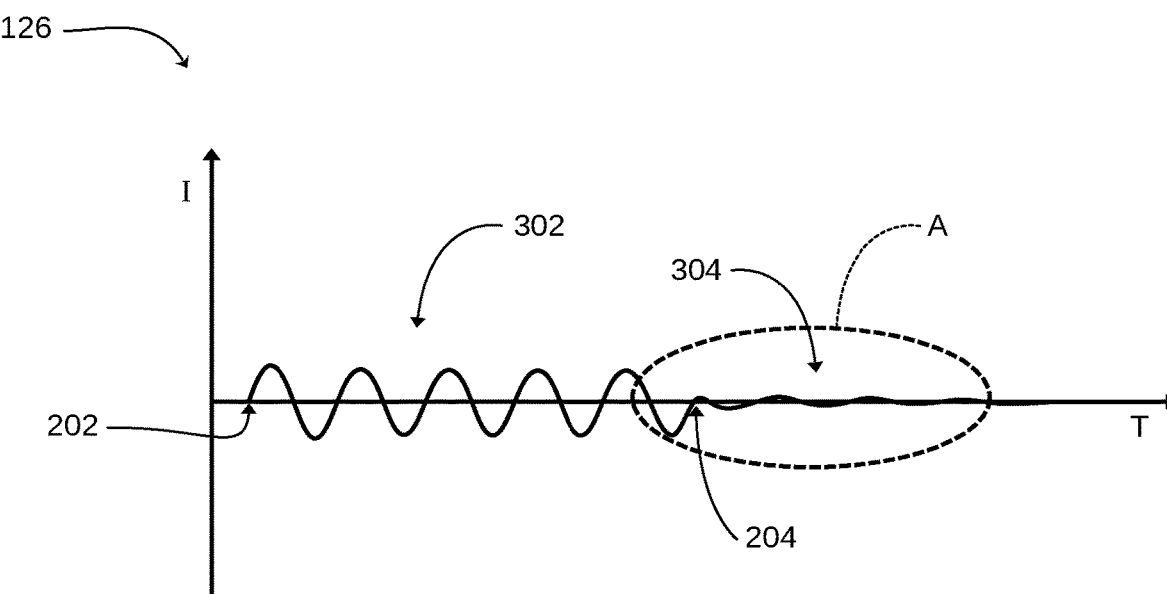
FIG. 3 is the current sense signal of FIG. 1.

Referring now to FIG. 3, therein is shown the current sense signal 126 of FIG. 1. The current sense signal 126 can be a digital representative, produced by the current ADC 120 of FIG. 1.

The current sense signal 126 can be the current detected and measured across the current resistor 118 on the output P line 116, both of FIG. 1. As will be appreciated, the current sense signal 126 closely follows and resembles the haptic pattern 104 of FIG. 1.

The current sense signal 126 is depicted with a drive current 302 between the haptic pattern start time 202 and the haptic pattern stop time 204. After the haptic pattern stop time 204 the current sense signal 126 depicts back EMF current 304, which is depicted in greater detail below with regard to area A of FIGS. 4 and 5.

The back EMF current 304 in practice and as shown is a weak signal. However, it has been discovered that the back EMF current 304 can be detected and measured based on any haptic pattern 104 if it generates enough acceleration.

The back EMF current 304 can be used to determine the resonant frequency of the LRA 106 by counting the zero crossings of the back EMF current 304 over a length of time. The time between two zero crossings 502 over one can be understood as half the resonant frequency of the LRA 106.

Figure 4:
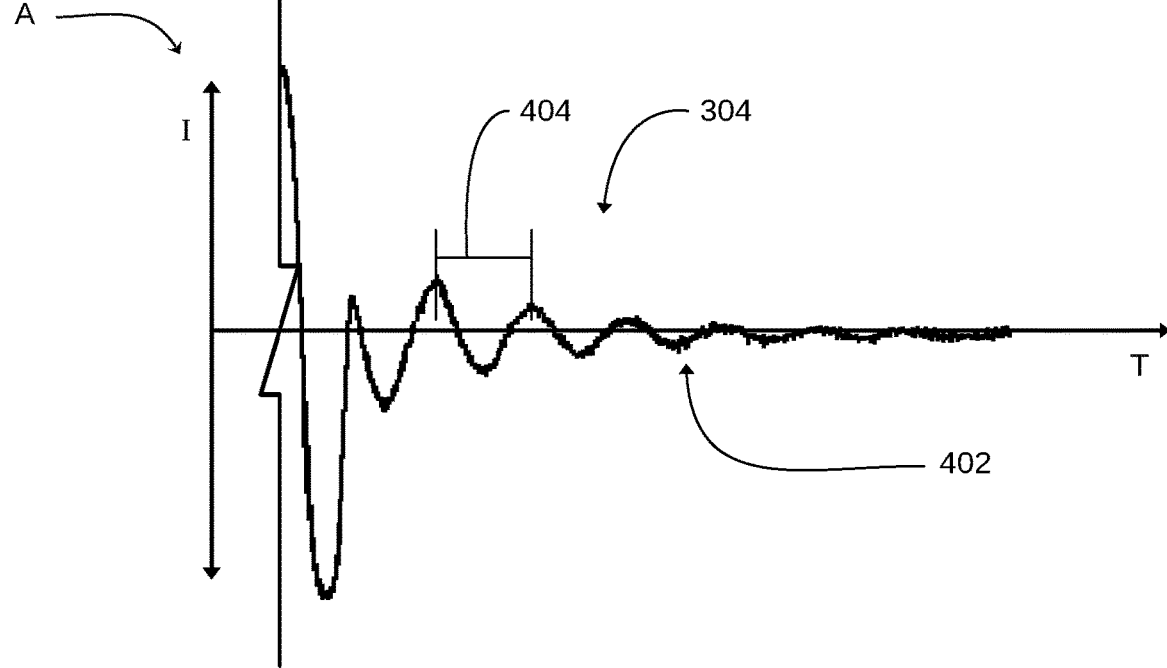
FIG. 4 is a magnified view of area A of FIG. 3.

Referring now to FIG. 4, therein is shown a magnified view of area A of FIG. 3. The back EMF current 304, of the current sense signal 126 of FIG. 1 detected by the current ADC 120 of FIG. 1, is shown in an unfiltered state.

The back EMF current 304 can have a low signal to noise ratio with higher frequency artifacts 402 depicted thereon. The back EMF current 304 is shown attenuating over time but with the same peak-to-peak wavelength 404, which represents the resonant frequency of the LRA 106 of FIG. 1. More particularly the resonant frequency of the LRA 106 can be the sampling rate of the current ADC 120 divided by the number of samples between two peaks.

Figure 5:
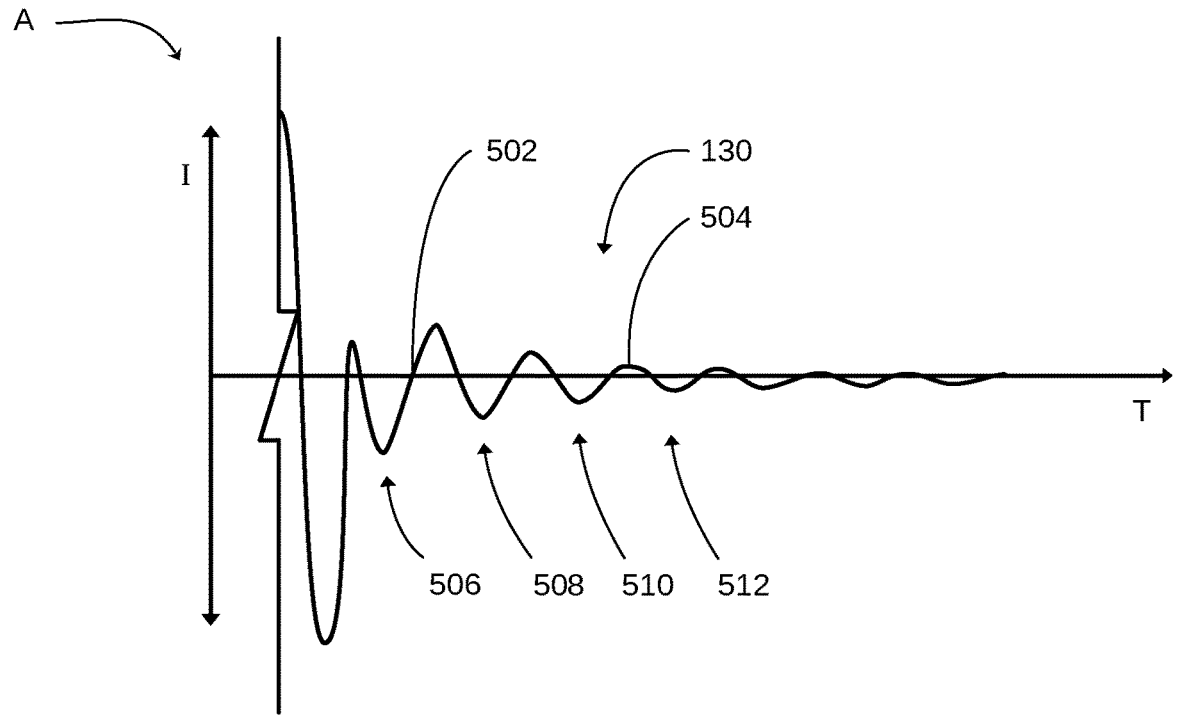
FIG. 5 is the filtered current sense signal of area A of FIG. 3 after a filtering step.

Referring now to FIG. 5, therein is shown the filtered current sense signal 130 of area A of FIG. 3 after a filtering step. The filtered current sense signal 130 can be the current sense signal 126 of FIG. 1 after being filtered by the low pass filter 128 of FIG. 1.

Alternatively, it is contemplated that the filtered current sense signal 130 can be generated within the processor 102 of FIG. 1 using a digital DSP low pass filter. The filtered current sense signal 130 makes zero crossings 502 and peaks of the filtered current sense signal 130 more detectable.

The filtered current sense signal 130 can include two components, the drive current 302 of FIG. 3 and the back EMF current 304. The back EMF current 304 can be isolated within the filtered current sense signal 130 with digital signal processing within the processor 102. That is, the pattern of the voltage sense signal 138 can be filtered out or removed from the filtered current sense signal 130, which can remove the drive current 302 created by the LRA drive voltage, which is measured as the voltage sense signal 138, and make the back EMF current 304 more discernible and clear.

The zero crossings 502 of the filtered current sense signal 130 can be measured over time by the processor 102. The time between two zero crossings 502 over one, can be understood as half the resonant frequency of the LRA 106 of FIG. 1.

Alternatively, the sampling frequency of the current ADC 120 of FIG. 1 divided by the number of samples between two peaks 504 of the back EMF current 304 can be understood as the resonant frequency of the LRA 106. As yet a further alternative, the sampling frequency of the current ADC 120 divided by the number of samples between three zero crossings 502 can be understood as the resonant frequency of the LRA 106.

The back EMF current 304 can have multiple cycles of importance, which are illustratively depicted between peaks 504 of the back EMF current 304 but could also be measured between the zero crossings 502 of the back EMF current 304. Filtering out the voltage sense signal 138 can identify the haptic pattern stop time 204 as the start time for a first back EMF current cycle 506.

The first back EMF current cycle 506 can be a convergence period from the frequency of the haptic pattern 104 of FIG. 1 to the LRA resonant frequency. This convergence time can correspond to the amount of acceleration experienced by the LRA 106.

A second back EMF current cycle 508 and a third back EMF current cycle 510 are the most accurate and detectable. The second back EMF current cycle 508 and the third back EMF current cycle 510 can be considered as the LRA resonant frequency with the third back EMF current cycle 510 providing the most consistent results. A fourth back EMF current cycle 512 is typically unreliable due to weak signal but can be the most accurate if enough acceleration is imparted to the vibrating mass 108 of FIG. 1 that the filtered current sense signal 130 can be obtained.

Figure 6:
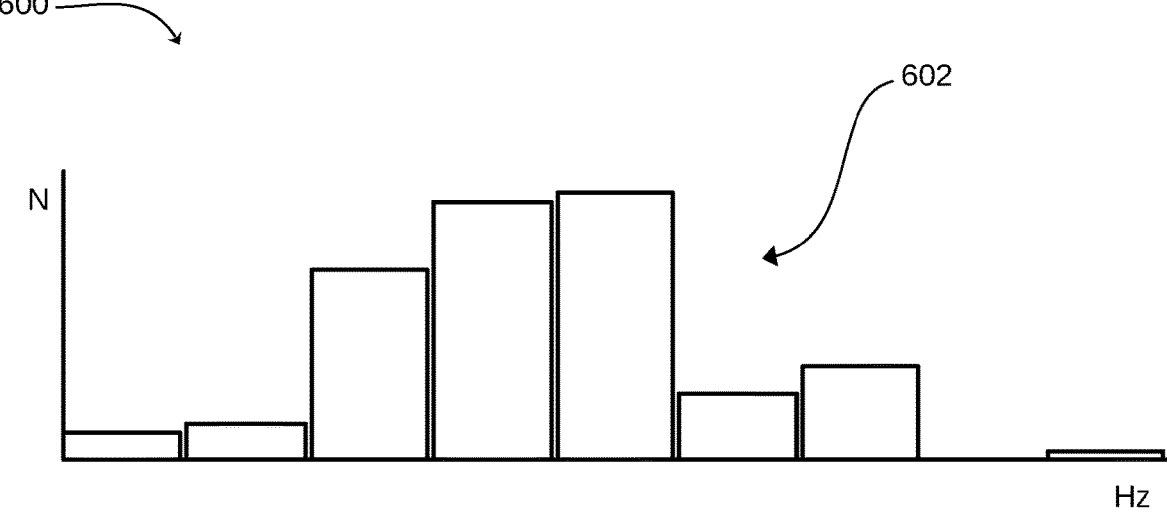
FIG. 6 is a graphical depiction of the distribution results for 100 trials.

Referring now to FIG. 6, therein is shown a graphical depiction 600 of distribution results for 100 readings. The graphical depiction 600 can, for example, illustrate resonant frequency (FO) readings 602 from the LRA 106 of FIG. 1 across the current resistor 118 of FIG. 1 from the second back EMF current cycle 508 of FIG. 5 or the third back EMF current cycle 510 of FIG. 5.

Frequency of the reading 602 is shown along the horizontal axis while the number of the readings 602 having a specific frequency is shown along the vertical axis. An illustrative distribution of readings 602 could include: 3 readings 602 between 160 Hz and 161.1 Hz, 4 readings 602 between 161.1 Hz and 162.2 Hz, 20 readings 602 between 162.2 Hz and 163.3 Hz, 27 readings 602 between 163.3 Hz and 164.4 Hz, 28 readings 602 between 164.4 Hz and 165.5 Hz, 7 readings 602 between 165.5 Hz and 166.6 Hz, 10 readings 602 between 166.6 Hz and 167.7 Hz, 0 readings 602 between 167.7 Hz and 168.8 Hz, and 1 reading between 168.8 Hz and 169.9 Hz.

The best result can be obtained by averaging the readings 602 and removing outliers based on the specification of the LRA 106. It has been found that seventy-five percent of total readings 602 are in a plus or minus 1.5 Hz range with over 5% of readings 602 showing a 9 Hz error.

Figure 7:
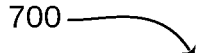
FIG. 7 is a method of manufacturing the current based resonant frequency tracking system of FIG. 1.
Figure 7:
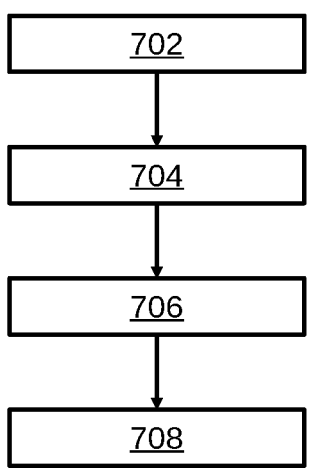

Referring now to FIG. 7, therein is shown a control flow 700 for a method of operating the current based resonant frequency tracking system of FIG. 1. The control flow 700 can include providing a haptic pattern with a processor, the haptic pattern including both a haptic pattern start time and a haptic pattern stop time in a block 702; driving a linear resonant actuator according to the haptic pattern with an amplifier coupled to the processor, and the amplifier having an output coupled to the linear resonant actuator in a block 704; detecting a current sense signal having a back electromotive force current after the haptic pattern stop time with a current frequency tracker coupled to the output of the amplifier in a block 706; and measuring a frequency of the back electromotive force current as a resonant frequency of the linear resonant actuator in a block 708.

Thus, it has been discovered that the current based resonant frequency tracking system allows a standard audio amplifier to be used and can read continuously without requiring a High-Z capable LRA. This simultaneously simplifies design and manufacturing while also providing a feature rich and highly robust current based resonant frequency tracking system.

The current based resonant frequency tracking system thereby furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the current based resonant frequency tracking system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A method of operating a current based resonant frequency tracking system comprising:

providing a haptic pattern with a processor, the haptic pattern concluding with a haptic pattern stop time;

driving a linear resonant actuator according to the haptic pattern with an amplifier coupled to the processor, and the amplifier having an output coupled to the linear resonant actuator;

detecting a current sense signal having a back electromotive force current after the haptic pattern stop time with a current frequency tracker coupled to the output of the amplifier; and measuring a frequency of the back electromotive force current as a resonant frequency of the linear resonant actuator.

2. The method of claim 1 wherein detecting the current sense signal with the current frequency tracker includes detecting the current sense signal with an analog-to-digital converter measuring across a resistor between the amplifier and the linear resonant actuator.

3. The method of claim 1 further comprising filtering the current sense signal with a low pass filter coupled to the current frequency tracker.

4. The method of claim 1 further comprising:

determining a voltage sense signal on the output of the amplifier with an analog-to-digital converter; and using the processor to filter the current sense signal and to isolate, based on the voltage sense signal, the back electromotive force current.

5. The method of claim 1 wherein driving the linear resonant actuator includes driving a dual mode linear resonant actuator to produce a haptic vibration, an audible tone, or a combination of both.

6. A method of operating a current based resonant frequency tracking system comprising:

providing a haptic pattern with a processor, the haptic pattern concluding with a haptic pattern stop time;

driving a linear resonant actuator according to the haptic pattern with an amplifier coupled to the processor, and the amplifier having an output coupled to the linear resonant actuator;

detecting a current sense signal having a back electromotive force current after the haptic pattern stop time with a current frequency tracker coupled to the output of the amplifier;

measuring a frequency of the back electromotive force current as a resonant frequency of the linear resonant actuator; and detecting cycles in the back electromotive force current after the haptic pattern stop time.

7. The method of claim 6 further comprising discarding a first back electromotive force current cycle with the processor.

8. The method of claim 6 wherein detecting the cycles in the back electromotive force current includes detecting the cycles between peaks of the back electromotive force current.

9. The method of claim 6 wherein detecting the cycles in the back electromotive force current includes detecting the cycles between zero crossings of the back electromotive force current.

10. The method of claim 6 wherein detecting the cycles in the back electromotive force current includes detecting a second back electromotive force current cycle or a third back electromotive force current cycle as the resonant frequency of the linear resonant actuator.

11. A current based resonant frequency tracking system comprising:

a processor configured to provide a haptic pattern, the haptic pattern concluding with a haptic pattern stop time;

an amplifier coupled to the processor, the amplifier having an output configured to couple to a linear resonant actuator and configured to drive the linear resonant actuator according to the haptic pattern; and a current frequency tracker coupled to the output of the amplifier configured to detect a current sense signal having a back electromotive force current after the haptic pattern stop time, and the processor configured to measure a frequency of the back electromotive force current as a resonant frequency of the linear resonant actuator.

12. The system of claim 11 wherein the current frequency tracker is an analog-to-digital converter configured to measure across a resistor between the amplifier and the linear resonant actuator.

13. The system of claim 11 further comprising a low pass filter coupled to the current frequency tracker.

14. The system of claim 11 further comprising an analog-to-digital converter configured to determine a voltage sense signal on the output of the amplifier; and wherein the processor is configured to filter the current sense signal based on the voltage sense signal and isolate the back electromotive force current.

15. The system of claim 11 wherein the linear resonant actuator is a dual mode linear resonant actuator configured to produce a haptic vibration, an audible tone, or a combination of both.

16. The system of claim 11 wherein the processor is configured to detect cycles in the back electromotive force current after the haptic pattern stop time.

17. The system of claim 16 wherein the processor is configured to discard a first back electromotive force current cycle.

18. The system of claim 16 wherein the processor is configured to detect the cycles in the back electromotive force current between peaks of the back electromotive force current.

19. The system of claim 16 wherein the processor is configured to detect the cycles in the back electromotive force current between zero crossings of the back electromotive force current.

20. The system of claim 16 wherein the processor is configured to detect a second back electromotive force current cycle or a third back electromotive force current cycle as the resonant frequency of the linear resonant actuator.

* * * * *